May 20, 1958 J. E. FLAGG ET AL 2,834,965
FLEXIBLE JOINT FOR INFLATABLE GARMENTS
Filed April 6, 1953 2 Sheets-Sheet 1

INVENTORS
JOHN E. FLAGG
JUSTIN E. WALSH
BY Owen W. Kennedy
ATTORNEY

May 20, 1958 J. E. FLAGG ET AL 2,834,965
FLEXIBLE JOINT FOR INFLATABLE GARMENTS
Filed April 6, 1953 2 Sheets-Sheet 2

INVENTORS
JOHN E. FLAGG
JUSTIN E. WALSH
BY Owen W. Kennedy
ATTORNEY

United States Patent Office 2,834,965
Patented May 20, 1958

2,834,965

FLEXIBLE JOINT FOR INFLATABLE GARMENTS

John E. Flagg, Worcester, and Justin E. Walsh, Brookline, Mass., assignors to David M. Clark, Worcester, Mass.

Application April 6, 1953, Serial No. 347,074

6 Claims. (Cl. 2—2.1)

The present invention relates to inflatable garments, such as are worn by aviators engaged in high altitude flying, which garments are usually in the form of a suit enclosing the entire body of the wearer, so as to subject the body to a pressure medium admitted to the interior of the suit. The object of the present invention is to provide an improved construction of a flexible joint for incorporation in an inflatable suit, which joint will permit such ready bending of the enclosed limb of the wearer as to insure freedom of movement when the suit is fully inflated.

In the development of high altitude flying, pressurized suits have come into general use, which suits serve to enclose the entire body of the wearer within a gas-tight envelope of flexible material, the interior of which is maintained at a pressure considerably higher than the pressure of the surrounding atmosphere. Therefore, when the suit is in operation, a pressure differential exists between the interior of the suit and the surrounding atmosphere, with this pressure differential varying, dependent on altitude changes, owing to the necessity of subjecting the wearer's body to a substantially constant pressure, approximating atmospheric pressure at whatever lower altitude conditions it is desired to simulate.

As a result, the inflated material of any pressurized suit tends to become increasingly stiff, taut and inflexible as the aircraft reaches higher and higher elevations, with those portions of the suit enclosing the limbs becoming more and more resistant to flexure or bending of the enclosed joints, such as elbow or knee. Consequently, there is a loss of mobility on the part of the wearer when subjected to this tendency of the suit to become rigid, in opposition to such bending or flexure of knees or elbows as may be required for operation of the aircraft controls.

According to the present invention, the above described difficulties heretofore encountered with pressurized suits are overcome by the provision of a flexible joint for incorporation in any limb enclosing portion thereof, which joint encircling the wearer's knee or elbow, is capable of being readily bent when the suit is fully inflated and of remaining in either the bent position or the straight position without requiring excessive effort by the wearer. The improved joint is so constructed as to permit opposite sides thereof to vary in length in substantially the same manner and degree as does the skin on opposite sides of the knee or elbow encircled thereby. The construction is such that when the joint is pressurized it tends to assume a partially bent neutral position from which it may be readily bent or flexed in either direction.

The above and other advantageous features of the present invention will hereinafter more fully appear from the following description, when considered in connection with the accompanying drawings, in which, Fig. 1 is a view in side elevation of the inflated leg portion of a pressurized suit provided with a flexible knee encircling joint construction embodying the present invention.

Figure 1:
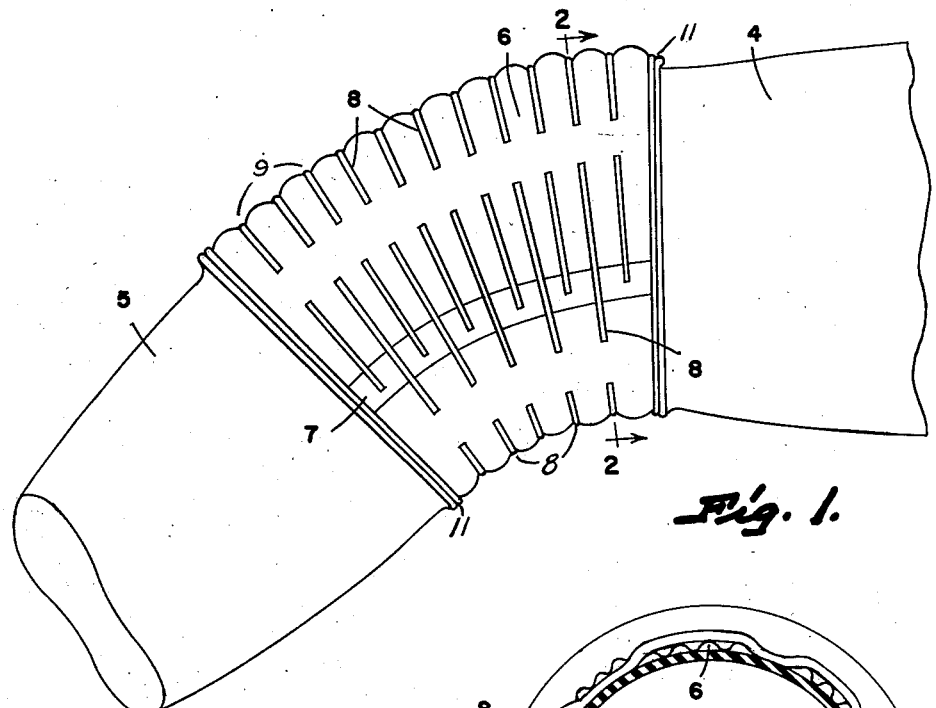
Figure 2:
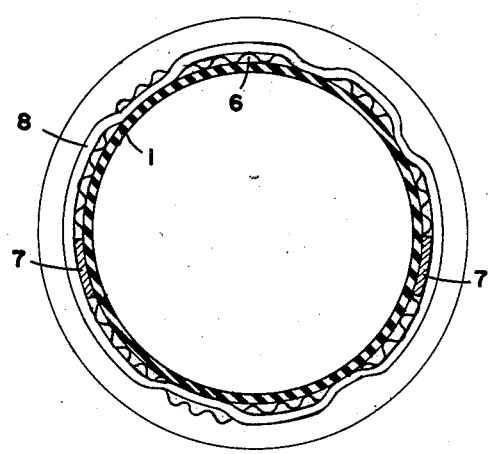
Fig. 2 is a transverse sectional view along the line 2—2 of Fig. 1, looking in the direction of the arrows.

Referring to the drawings, Fig. 1 shows our improved flexible joint as being incorporated in that portion of the leg of a pressurized suit which encloses the knee of the wearer. Our improved flexible joint, as hereinafter described, is of tubular construction and is here shown, for knee encircling purposes, as interposed in connecting relation between a tubular thigh-encircling section 4 and a tubular calf-encircling section 5 of an inflatable suit, said sections 4 and 5 being made of any suitable flexible gas-tight material. Obviously, the flexible joint of our invention could also be incorporated in other portions of the suit, such as an arm, where it would surround an elbow of the wearer.

Figures 3, 4:
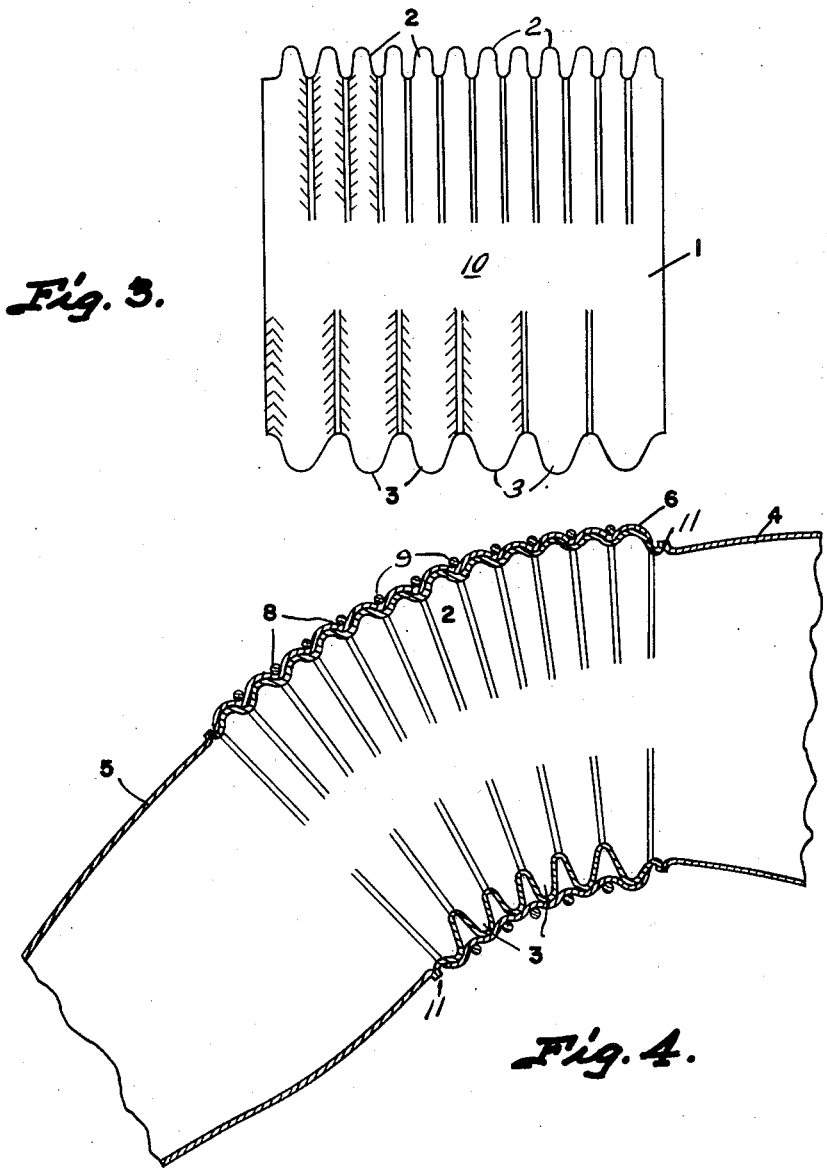
Fig. 3 is a view in side elevation of the inner tubular member of our improved flexible joint.
Fig. 4 is a longitudinal sectional view along the central axis of the inflated leg portion and flexible joint of Fig. 1.

The principal element of our improved flexible joint is the relatively thin walled tubular member 1, shown separately in Fig. 3, said tubular member being of molded rubber or other suitable flexible gas-tight material. The wall of said tubular member 1 is molded or formed with two different sets of transverse corrugations, designated respectively at 2, 2 and 3, 3. The corrugations 2, 2 extend for approximately 180 degrees, and the corrugations 3, 3 have a somewhat smaller circumferential extent, whereby said tube is left smooth or uncorrugated, as shown at 10, Fig. 3, along diametrically opposite areas between its two different sets of corrugations. The corrugations 2, 2 are appreciably more numerous than the corrugations 3, 3, there being here shown for purposes of illustration, twelve of the corrugations 2, 2 and only six of the corrugations 3, 3.

Incorporation of this differentially corrugated tubular member 1 into the suit's limb portion is effected by connecting its opposite ends to the tubular sections 4 and 5 respectively, as by means of the annular seals indicated at 11, 11 in Figs. 1 and 4. This connection disposes the tubular member 1 in position to encircle a wearer's limb joint (in this case the wearer's knee), the connection being so made that the outer front or convex side of the knee will be covered by the predominantly corrugated portion of tubular member 1, that is, the portion having the numerous corrugations 2, 2. Under these conditions, the admission of pressure medium to the interior of the suit will cause the sections 4 and 5 to be inflated and held taut in surrounding relation to the thigh and calf of the wearer's leg. At the same time the intermediate joint section 1 will be inflated substantially in the manner indicated in Fig. 4, the stretching of the rubber being limited by the restraining action of an outer casing 6 which surrounds the inner section 1, and is conformed to the two sets of corrugations 2 and 3 in a manner which will next be described with reference to Fig. 1.

Figure 5:
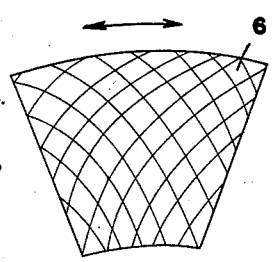
Figs. 5 and 6 are diagrammatic views illustrating the stretch characteristics of the fabric employed for the outer casing of our improved flexible joint.
Figure 6:
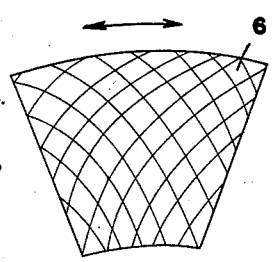

The restraining casing 6 is composed of a woven fabric which is capable of stretching on the bias, such a fabric being produced by what is known as a "waffle" weave. This fabric has the property of stretching to the limit in one direction with very little effort, while the material will tend to pull together in a direction at right angles to the direction of stretch. Figs. 5 and 6 illustrate such a fabric in its normal and stretched conditions. The casing 6 is made in two parts of different lengths to match the different lengths as measured along the respective convex outside and concave inside portions of the inflated joint of Fig. 1.

The two parts of the casing 6 are secured together by nonstretchable strips 7 extending along the sides of the joint in overlying relation to the two uncorrugated portions 10, 10 of the tubular section 1 between the two sets of corrugations 2, 2 and 3, 3. These strips 7 serve to fix the length of the joint, while permitting the two parts of the restraining casing 6 to stretch freely on the bias, independently of each other.

In order to conform the two-part casing 6 with the sets of corrugations 2, 2 and 3, 3, and also to prevent undue expansion of the tubular section 1, our improved flexible joint construction provides two sets of nonstretchable cords, designated at 8, 8 and 9, 9 respectively in Fig. 1, said cord being reeved at intervals through the fabric of the casing 6. The set of cords 8, 8 extend entirely around the joint so as to be positioned in those depressions between the respective sets of corrugations 2, 2 and 3, 3 which are in alignment. The cords 9, 9 of the other series extend only part way around the joint so as to fit in alternate depressions between the outside series of corrugations 2, 2 with the ends of these cords being secured to the strips 7.

The purpose of the cords 8, 8 and 9, 9 is to limit the circumference of the joint when the inner section 1 is inflated, thereby fixing the section 1 in position when inflated. Furthermore, the cords 8, 8 and 9, 9 serve to conform the material of the casing 6 to the corrugations 2, 2 and 3, 3 of the inflated section 1, so that the casing exerts a very effective restraining action against undue expansion of the section 1 as a result of the existence of a high pressure differential between the interior of the suit and the outside atmosphere at very high altitudes. In other words, the combined action of the casing 6 and the cords 8, 8 and 9, 9 serves to limit the circumference of the joint and to conform the stretched fabric of the casing 6 to the respective sets of corrugations 2, 2 and 3, 3 in such manner that the section 1 tends to assume a natural curvature without loss of flexibility, as will be evident from a consideration of Fig. 4.

It has been found that when the suit is worn and inflated, the functioning of the joint is such as to permit freedom of action of the wearer's knee, due to the fact that the length of the joint becomes variable on opposite sides of a central axis in substantially the same manner and degree as the length of the skin varies on opposite sides of the wearer's knee in different positions thereof, as in bending. Furthermore, when a garment limb portion, equipped with our flexible joint, is pressurized in the absence of a leg or arm therefrom, it has been found that such limb portion will assume a half bent neutral position from which it may be moved to either a straight or right angle position with a minimum of effort. This ease of movement in either direction is permitted by the above-described differentially corrugated construction of the inner tubular member 1 which lends itself either to folding together or opening up of the respective sets of corrugations 2, 2 and 3, 3, as well as by the stretchability of the casing 6, when the leg is moved in either direction from the position of Fig. 1.

From the foregoing it is apparent that by the present invention there is provided an improved flexible joint for incorporation in the leg or arm of a pressurized suit such as is worn by aviators engaged in high altitude flying. This joint is capable of being readily bent when the suit is fully inflated and of remaining bent without requiring excessive effort by the wearer, regardless of any increases in suit pressure, so that the wearer of the suit retains his mobility under the most extreme flying conditions.

We claim:

1. A flexible joint for an inflatable garment comprising a tube of flexible gas-tight material for encircling a wearer's limb joint, a first plurality of circumferential corrugations on the upper portion of said tube, a second plurality of circumferential corrugations on the lower portion of said tube, and a pair of smooth longitudinal areas on opposite sides of said tube separating said upper corrugations from said lower corrugations, said upper portion of said tube having a greater number of corrugations than the lower portion thereof so as to permit a relatively greater expansion of said upper portion.

2. A flexible joint for an inflatable garment comprising an inner tube of flexible gas-tight material for encircling a wearer's limb joint, a first plurality of circumferential corrugations on the upper portion of said tube, a second plurality of circumferential corrugations on the lower portion of said tube, a pair of smooth longitudinal areas on opposite sides of said tube separating said upper corrugations from said lower corrugations, said upper portion of said tube having a greater number of corrugations than said lower portion so as to permit a relatively greater expansion of said upper portion, and an outer restraining casing of fabric material surrounding said tube.

3. A flexible joint for an inflatable garment comprising an inner tube of flexible gas-tight material for encircling a wearer's limb joint, a first plurality of circumferential corrugations on the upper portion of said tube, a second plurality of circumferential corrugations on the lower portion of said tube, a pair of smooth longitudinal areas on opposite sides of said tube separating said upper corrugations from said lower corrugations, said upper portion of said tube having a greater number of corrugations than said lower portion so as to permit a relatively greater expansion of said upper portion, a pair of stretchable fabric coverings for the upper and lower portions of said tube, and a pair of nonstretchable strips covering said smooth areas for connecting said stretchable fabric coverings.

4. A flexible joint for an inflatable garment comprising an inner tube of flexible gas-tight material for encircling a wearer's limb joint, a first plurality of circumferential corrugations on the upper portion of said tube, a second plurality of circumferential corrugations on the lower portion of said tube, a pair of smooth longitudinal areas on opposite sides of said tube separating said upper corrugations from said lower corrugations, said upper portion of said tube having a greater number of corrugations than said lower portion so as to permit a relatively greater expansion of said upper portion, a pair of stretchable fabric coverings for the upper and lower portions of said tube, each of said fabric coverings conforming to the shape of the corrugations of its respective covered portion, a pair of nonstretchable longitudinal strips covering said smooth areas and connecting said stretchable fabric coverings, a first series of nonstretchable circular cords extending entirely around said joint and reeved through said fabric coverings, said first series of cords fitting into the lower depressions between said lower corrugations and into those upper depressions between said upper corrugations which are opposed to said lower depressions, and a second series of nonstretchable and substantially semi-circular cords reeved through the upper fabric covering and connected to said longitudinal strips, said second series of cords fitting into the remaining non-opposed depressions between said upper corrugations.

5. A flexible joint for inflatable garments comprising an inner tube of flexible gas-tight material for encirclement of a wearer's limb joint, said tube having an upper circumferentially corrugated portion for covering the outer convex side of said limb joint, a lower circumferentially corrugated portion for covering the inner concave side of said limb joint, and a pair of smooth longitudinal portions on the opposite sides of said tube for connecting said upper and lower portions, said upper portion having a greater number of corrugations than said lower portion so as to permit a relatively greater expansion of said upper portion, and an outer restraining casing of fabric material surrounding said tube and conforming to the shape thereof.

6. A flexible joint for inflatable garments comprising an inner tube of flexible gas-tight material for encirclement of a wearer's limb joint, said tube having an upper circumferentially corrugated portion for covering the outer convex side of said limb joint, a lower circumferentially corrugated portion for covering the inner concave side of said limb joint, and a pair of smooth longitudinal portions on the opposite sides of said tube for connecting said upper and lower portions, said upper portion having a greater number of corrugations than said lower portion so as to permit a relatively greater expansion of said upper portion, a pair of flexible stretchable fabric pieces for covering said upper and lower portions of said tube, and a pair of flexible nonstretchable fabric strips for covering said smooth portions and for connecting said stretchable fabric pieces.

References Cited in the file of this patent

UNITED STATES PATENTS

| | | |
|---|---|---|
| 2,338,424 | Giardini | Jan. 4, 1944 |
| 2,392,992 | Martin | Jan. 15, 1946 |
| 2,410,632 | Colley et al. | Nov. 5, 1946 |
| 2,550,044 | Delsalle | Apr. 24, 1951 |
| 2,563,763 | Vietas | Aug. 7, 1951 |
| 2,640,989 | Woodward | June 9, 1953 |